US010735328B2

United States Patent
Ochi et al.

(10) Patent No.: US 10,735,328 B2
(45) Date of Patent: Aug. 4, 2020

(54) INFORMATION COMMUNICATION SYSTEM, INFORMATION COMMUNICATION METHOD AND DEVICE

(71) Applicant: NEC Corporation, Minato-ku, Tokyo (JP)

(72) Inventors: Takao Ochi, Tokyo (JP); Ken-ichiro Yoshino, Tokyo (JP); Akio Tajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 34 days.

(21) Appl. No.: 15/502,245

(22) PCT Filed: Aug. 20, 2015

(86) PCT No.: PCT/JP2015/004158
§ 371 (c)(1),
(2) Date: Feb. 7, 2017

(87) PCT Pub. No.: WO2016/031194
PCT Pub. Date: Mar. 3, 2016

(65) Prior Publication Data
US 2017/0237666 A1  Aug. 17, 2017

(30) Foreign Application Priority Data

Aug. 25, 2014  (JP) .................................. 2014-170087

(51) Int. Cl.
*H04L 12/803*  (2013.01)
*H04L 9/08*  (2006.01)
(Continued)

(52) U.S. Cl.
CPC .............. *H04L 47/125* (2013.01); *H04L 9/08* (2013.01); *H04L 9/0852* (2013.01);
(Continued)

(58) Field of Classification Search
None
See application file for complete search history.

(56) References Cited

U.S. PATENT DOCUMENTS 6,018,581 A * 1/2000 Shona ................... H04L 9/0662
380/227
2002/0056040 A1  5/2002 Simms
(Continued)

FOREIGN PATENT DOCUMENTS

CN  102055584 A  5/2011
CN  103326850 A  9/2013
(Continued)

OTHER PUBLICATIONS

Communication dated Mar. 21, 2018 from the European Patent Office in counterpart application No. 15837039.5.
(Continued)

*Primary Examiner* — Ayaz R Sheikh
*Assistant Examiner* — Sori A Aga (57) ABSTRACT

In order to achieve the dispersion of a processing load between communication devices that perform information transmission, an information communication system according to an exemplary aspect of the present invention includes a first transmission system configured to transmit information in a direction from a first communication device to a second communication device; and a second transmission system configured to transmit information in a direction opposite to the direction of the first transmission system, wherein part of transmission information is received as received information in each of the first transmission system and the second transmission system.

7 Claims, 4 Drawing Sheets

(51) Int. Cl.
*H04L 9/12* (2006.01)
*H04L 12/863* (2013.01)

(52) U.S. Cl.
CPC ............ *H04L 9/0869* (2013.01); *H04L 9/12* (2013.01); *H04L 9/0858* (2013.01); *H04L 47/54* (2013.01)

(56) References Cited

U.S. PATENT DOCUMENTS

| | | | | |
|---|---|---|---|---|
| 2007/0230688 | A1* | 10/2007 | Tajima | H04L 9/0858 380/30 |
| 2011/0096925 | A1 | 4/2011 | Zhu et al. | |
| 2012/0177065 | A1 | 7/2012 | Winzer | |
| 2012/0177368 | A1 | 7/2012 | Aoki | |
| 2013/0251154 | A1 | 9/2013 | Tanizawa et al. | |
| 2017/0104546 | A1* | 4/2017 | Bitauld | H04B 10/70 |

FOREIGN PATENT DOCUMENTS

| | | | |
|---|---|---|---|
| CN | 103477581 A | 12/2013 | |
| CN | 103618597 A | 3/2014 | |
| EP | 1054524 A2 * | 11/2000 | ............ H04J 14/02 |
| EP | 1 755 269 B1 | 10/2014 | |
| JP | H09-238132 A | 9/1997 | |
| JP | 2000-332655 A | 11/2000 | |
| JP | 2011-082832 A | 4/2011 | |
| JP | 2012-147078 A | 8/2012 | |

OTHER PUBLICATIONS

Hughes et al., "Quantum key distribution over a 48km optical fibre network", Journal of Modern Optics, vol. 47, No. 2/3, 2000, pp. 533-547. (16 pages total).
Brodsky et al., "Effect of a Weak Magnetic Field on Quantum Cryptography Links", ECOC 2005 Proceedings, vol. 6, Sep. 25, 2005, pp. 19-20.
Charles H. Bennett et al. "Quantum Cryptography: Public Key Distribution and Coin Tossing" IEEE Int. Conf. on Computers, Systems, and Signal Processing, Bangalore, India, Dec. 10-12, 1984.
International Search Report for PCT Application No. PCT/JP2015/004158, dated Sep. 29, 2015.
English translation of Written opinion for PCT Application No. PCT/JP2015/004158.
Chinese Office Action for CN Application No. 201580045957.0 dated Jul. 2, 2019 with English Translation.

* cited by examiner

SECOND EXAMPLE EMBODIMENT

FIG. 4

INFORMATION COMMUNICATION SYSTEM, INFORMATION COMMUNICATION METHOD AND DEVICE

This application is a National Stage Entry of PCT/JP2015/004158 filed on Aug. 20, 2015, which claims priority from Japanese Patent Application 2014-170087 filed on Aug. 25, 2014, the contents of all of which are incorporated herein by reference, in their entirety.

TECHNICAL FIELD

The present invention relates to an information communication system, an information communication method and device to transmit and receive information between communication devices.

BACKGROUND ART

In a data transmission between communication devices, not all of information transmitted from a transmission side is received at a receiving end. For example, it is known that a packet loss occurs due to a load state or the like of a network, and, in addition, there is a communication system in which only a part of transmitted data reaches to the receiver as characteristics of a transmission system including a transmitter, a receiver, and a channel that connects them. As an example of such communication system, a quantum key distribution (QKD) system will be described briefly.

It is necessary to share a shared key required for encryption and decryption of information between a transmission end and a receiving end as secret information, and QKD technology is regarded to be promising as a technology to generate and share such secret information. According to the QKD technology, contrary to a conventional optical communication, it is possible to generate and share a common key between a transmitter and a receiver by transmitting a random number with the number of photons per bit equal to one or less. The QKD technology has the security that is based on the principle of quantum mechanics that a photon observed once cannot be completely returned to the quantum state before the observation, not the security that is based on conventional computational complexity.

It is necessary in the QKD technology to carry out several steps before an encryption key used for cryptographic communication is generated. Hereinafter, a generation process of a typical encryption key will be described with reference to FIG. 1.

Figure 1:
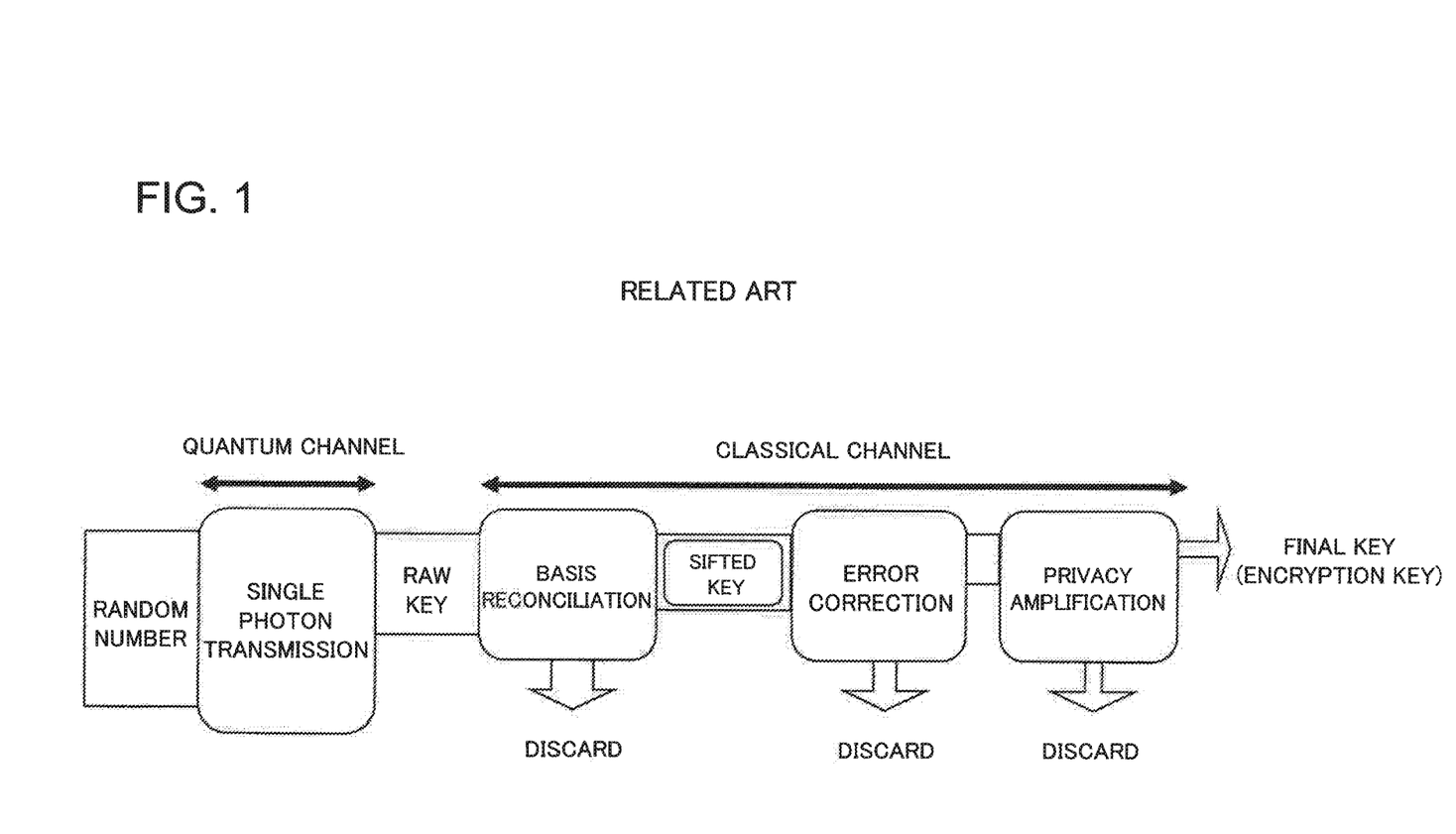
FIG. 1 is a schematic diagram to illustrate information-processing steps in a quantum key distribution (QKD) system.

As shown in FIG. 1, in a single photon transmission, a random number is transmitted through a quantum channel by a weak optical pulse train with the number of photons per bit equal to one or less, as mentioned above. As the QKD method, a BB84 method using four quantum states is widely known (Non Patent Literature 1), for example. When a transmitter transmits an original random number by a single photon transmission, most of it is lost due to the loss or the like of a transmission line; and bits that can be received by a receiver become a very small part of the transmitted bits, which is called a raw key. For example, the data volume that can be received by a receiver is about $1/1000$ of the transmitted data volume.

Subsequently, a basis reconciliation, error correction, and privacy amplification processing are performed on the raw key that is received with most of the transmitted random numbers having been lost due to the quantum channel transmission, using a communication channel with normal optical intensity (classical channel). In each step of the basis reconciliation, error correction and, privacy amplification processing, a bit elimination is carried out to eliminate bits disclosed to the other side and the possibility of wiretapping. Thus, in a transmission system in which most of transmitting data is lost in a transmission channel, and data elimination is performed in subsequent processes, a received data volume finally obtained becomes very small compared with the transmitted data volume.

CITATION LIST

Non Patent Literature

[NPL 1] "QUANTUM CRYPTOGRAPHY, PUBLIC KEY DISTRIBUTION AND COIN TOSSING" IEEE Int. Conf. on Computers, Systems, and Signal Processing, Bangalore, India, Dec. 10-12, 1984, pp. 175-179, Bennett, Brassard

SUMMARY OF INVENTION

Technical Problem

As mentioned above, in a transmission system in which most of transmitting data is lost, a problem newly arises that the processing efficiency declines because large unbalance occurs with respect to a data volume to be processed between a transmission end to process transmitting data and a receiving end to process received data, and because the processing load of the transmitting end becomes larger.

The object of the present invention is to provide an information communication system, an information communication method and device that can achieve the dispersion of a processing load between communication devices that perform information transmission.

Solution to Problem

An information communication system according to an exemplary aspect of the present invention, an information communication system to transmit and receive information between communication devices, includes a first transmission system configured to transmit information in a direction from a first communication device to a second communication device; and a second transmission system configured to transmit information in a direction opposite to the direction of the first transmission system, wherein part of transmission information is received as received information in each of the first transmission system and the second transmission system.

A communication device according to an exemplary aspect of the present invention, a communication device to transmit and receive information to and from another communication device, includes a transmitting means for transmitting information to the another communication device through a first transmission line; and a receiving means for receiving information through a second transmission line from the another communication device, wherein part of transmission information is received as received information in each of the first transmission line and the second transmission line.

An information communication method according to an exemplary aspect of the present invention, an information communication method to transmit and receive information between the communication devices, includes transmitting and receiving information at each of a first communication device and a second communication device by use of a first transmission system and a second transmission system, the first transmission system and the second transmission system having transmission directions opposite to each other; and receiving part of transmission information as received information in each of the first transmission system and the second transmission system.

Advantageous Effects of Invention

According to the present invention, it becomes possible to disperse a processing load between communication devices.

EXAMPLE EMBODIMENT

The Outline of Example Embodiments

According to the example embodiments of the present invention, when part of transmission information is received as received information in a transmission system set between communication devices, it becomes possible to disperse a processing load between the communication devices by providing a pair of transmission systems with the transmission directions opposite to each other. In each communication device, if a predetermined processing using transmission information and a predetermined processing using receiving information are performed, the equalization of the processing loads can be achieved between the communication devices, and sufficient information generation efficiency can be obtained. Because both of the transmitter and the receiver are provided in each communication device, transmit data can be received by a receiver in the own device, and it becomes possible to adjust parameters of a transmitter in each communication device. Example embodiments of the present invention will be described below in detail using figures. The direction of the arrow in the figures indicates a direction as an example and does not limit the direction of the signals between the blocks.

1. The First Example Embodiment

Figure 2:
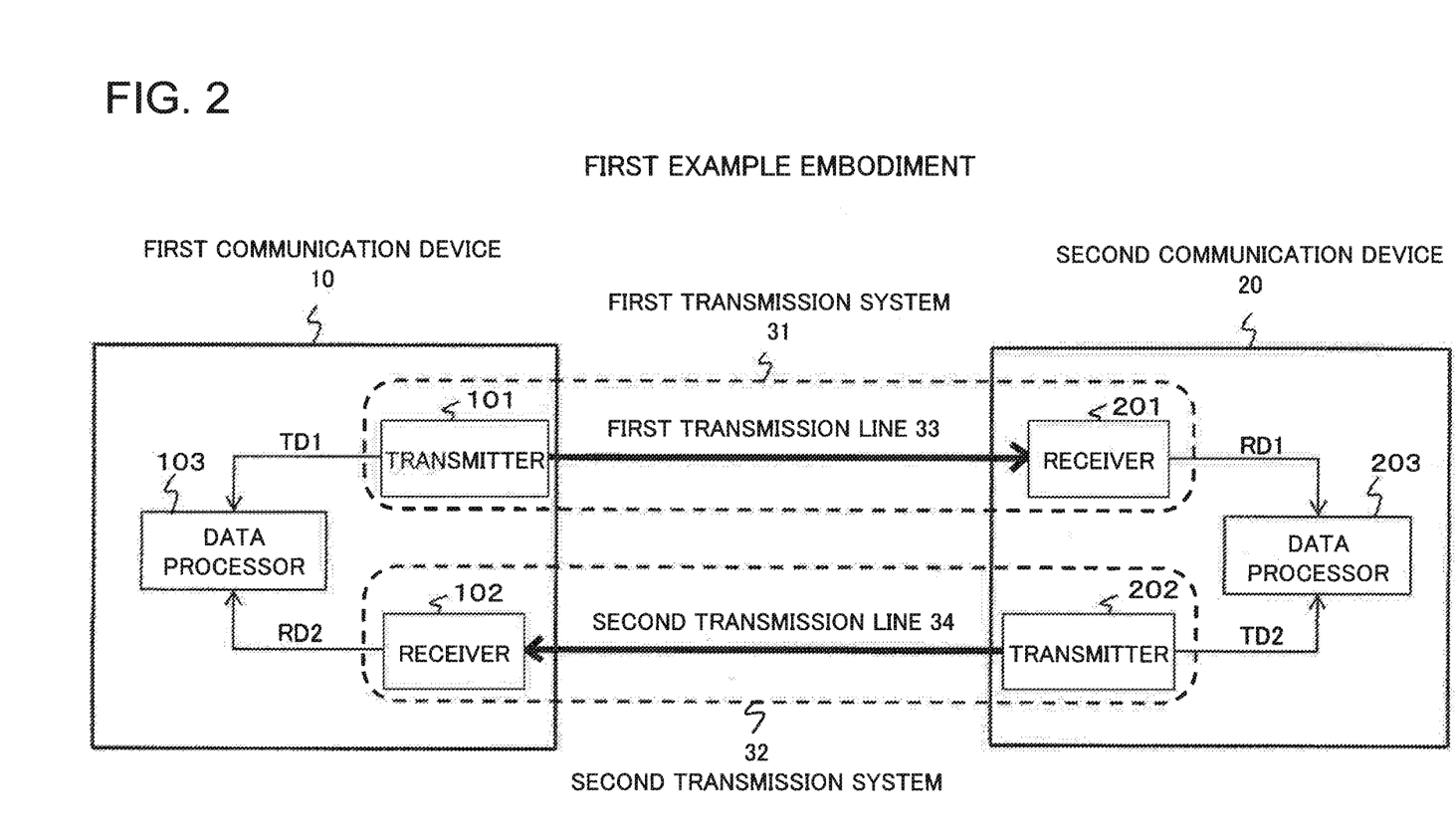
FIG. 2 is a block diagram illustrating a schematic configuration of an information communication system in accordance with a first example embodiment of the present invention.

As illustrated in FIG. 2, in an information communication system according to the first example embodiment of the present invention, a first communication device 10 and a second communication device 20 perform information transmission in the directions opposite to each other by a first transmission system 31 and a second transmission system 32. The first transmission system 31 performs one direction transmission from the first communication device 10 to the second communication device 20, and includes a transmitter 101 of the first communication device 10, a receiver 201 of the second communication device 20, and a first transmission line 33 connecting the transmitter 101 and the receiver 201. The second transmission system 32 performs one direction transmission in the direction opposite to that of the first transmission system 31, and includes a receiver 102 of the first communication device 10, a transmitter 202 of the second communication device 20, and a second transmission line 34 connecting the transmitter 202 and the receiver 102.

The first communication device 10 includes the transmitter 101, the receiver 102 and a data processor 103. The data processor 103 receives inputs of transmission information TD1 on the transmitter 101 and received information RD2 from the second communication device 20 that is received by the receiver 102, and performs predetermined data processing on the information respectively. The second communication device 20 includes the receiver 201, the transmitter 202 and, a data processor 203. The data processor 203 receives inputs of transmission information TD2 on the transmitter 202 and received information RD1 from the first communication device 10 that is received by the receiver 201, and performs predetermined data processing on the information respectively. The data processor 103 of the first communication device 10 and the data processor 203 of the second communication device 20 can perform an identical information processing and generate a similar sort of information, for example.

The first transmission system 31 transmits the information in the direction from the first communication device 10 to the second communication device 20, and has the characteristics that a received information volume becomes less than a transmission information volume. That is to say, the transmission information TD1 transmitted from the transmitter 101 is partially lost in the first transmission line 33 and/or the receiver 201, and only part of the transmission information TD1 is received by the receiver 201 as the received information RD1.

The second transmission system 32 transmits the information in the direction from the second communication device 20 to the first communication device 10 contrary to the first transmission system 31, and has the characteristics that a received information volume becomes less than a transmission information volume, as is the case with the first transmission system 31. That is to say, the transmission information TD2 transmitted from the transmitter 202 is transmitted through the second transmission line 34 and is received by the receiver 102. On this occasion, the transmission information TD2 is partially lost in the second transmission line 34 and/or the receiver 102, and only part of the transmission information TD2 is received by the receiver 102 as the received information RD2.

Consequently, the data processor 103 receives inputs of the transmission information TD1 having a large data volume and the received information RD2 having a relatively small data volume and performs processing, and similarly, the data processor 203 receives inputs of the transmission information TD2 having a large data volume and the received information RD1 having a relatively small data volume and performs processing. If the first transmission system 31 and 32 have similar transmission characteristics, and the data processors 103 and 203 perform identical information processing, it becomes possible to reduce the unbalance of loads regarding the data processing between the first communication device 10 and the second communication device 20.

As mentioned above, according to the present example embodiment, it becomes possible to disperse the processing loads between the communication devices by setting a pair of transmission systems 31 and 32 each of which transmits in a direction opposite to each other. That is to say, the processing capacity can be utilized efficiently because the processing load can be equalized between the communication devices. It becomes possible to generate efficiently desired information because each communication device can generate the information by processing both of the transmission information and the received information.

2. The Second Example Embodiment

Figure 3:
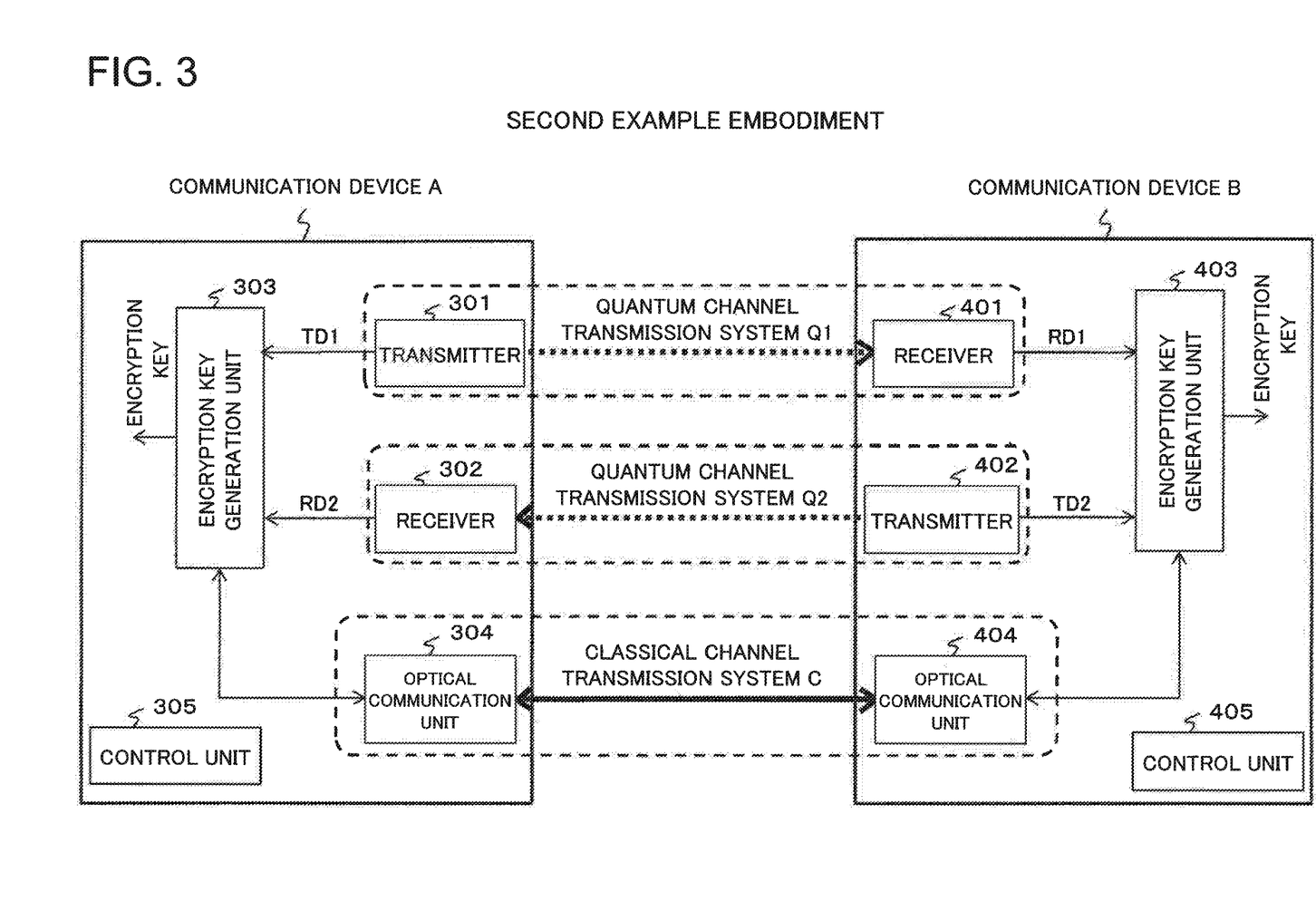
FIG. 3 is a block diagram illustrating a configuration example of an information communication system in accordance with a second example embodiment of the present invention.

As illustrated in FIG. 3, an information communication system according to the second example embodiment of the present invention is a system in which the first example embodiment mentioned above is applied to a QKD system.

In FIG. 3, a communication device A and a communication device B transmit a single photon pulse train modulated by random number information in the directions opposite to each other using a quantum channel transmission system Q1 and a quantum channel transmission system Q2. The quantum channel transmission system Q1 includes a transmitter 301 of the communication device A, a receiver 401 of the communication device B, a transmission line (quantum channel) connecting the transmitter 301 and the receiver 401. The quantum channel transmission system Q2 includes a transmitter 402 of the communication device B, a receiver 302 of the communication device A, and a transmission line (quantum channel) connecting the transmitter 402 and the receiver 302. In the present example embodiment, respective transmission lines of the quantum channel transmission systems Q1 and Q2 may be composed of optical fibers that physically differ from each other or may be wavelength-multiplexed in an identical optical fiber.

The communication device A and the communication device B perform optical communication with the optical power having a normal level using a classical channel transmission system C. The classical channel transmission system C includes an optical communication unit 304 of the communication device A, an optical communication unit 404 of the communication device B, and a transmission line (classical channel) connecting the optical communication unit 304 and the optical communication unit 404. The communication device A and the communication device B perform, in addition to the synchronous processing, the basis reconciliation with the other communication device, the error correction, and the privacy amplification processing, as mentioned above, using the classical channel transmission system C. A classical channel in the classical channel transmission system C may be provided by wavelength multiplexing in the same optical fiber as that including the quantum channel transmission systems Q1 and Q2. Alternatively, a synchronization channel for the synchronous processing can be provided in another optical fiber.

The classical channel of the classical channel transmission system C may be an electric communication path by an electric signal, not an optical communication. In this case, it is only necessary to replace the optical communication units 304 and 404 with communication units that transmit and receive an electric signal.

The communication device A includes the transmitter 301, the receiver 302, an encryption key generation unit 303, the optical communication unit 304, and a control unit 305. The encryption key generation unit 303 corresponds to the data processor 103 in the first example embodiment. The encryption key generation unit 303 receives inputs of transmission information (original random number) TD1 on the transmitter 301 and received information RD2 received by the receiver 302 from the communication device B. Then, the encryption key generation unit 303 generates an encryption key by performing the basis reconciliation with the communication device B through the optical communication unit 304, the error correction, and the privacy amplification processing, as mentioned above. The control unit 305 controls the overall operations of the communication device A.

The basic configuration of the communication device B is similar to that of the communication device A. That is to say, the communication device B includes the receiver 401, the transmitter 402, an encryption key generation unit 403, the optical communication unit 404, and a control unit 405. The encryption key generation unit 403 corresponds to the data processor 203 in the first example embodiment. The encryption key generation unit 403 receives inputs of transmission information (original random number) TD2 on the transmitter 402 and received information RD1 received by the receiver 401 from the communication device A. Then, the encryption key generation unit 403 generates an encryption key by performing the basis reconciliation with the communication device A through the optical communication unit 404, the error correction, and the privacy amplification processing, as mentioned above. The control unit 405 controls the overall operations of the communication device B.

In the quantum channel transmission system Q1, the transmitter 301 of the communication device A puts the transmission information (original random number bit information) TD1 on a very weak optical pulse train with the number of photons per bit equal to one or less, and transmits it to the receiver 401 of the communication device B through a quantum channel. The weak optical pulse train in transmission is lost in the middle of the transmission line, and only part of it reaches the receiver 401. The receiver 401 outputs detected data to the encryption key generation unit 403 as received information RD1. As mentioned above, the information volume of the received information RD1 gets down to about $1/1000$ of the information volume of the transmission information TD1, for example.

In the quantum channel transmission system Q2, the transmitter 402 of the communication device B puts the transmission information (original random number bit information) TD2 on a very weak optical pulse train with the number of photons per bit equal to one or less, and transmits it to the receiver 302 of the communication device A through a quantum channel. In this case, its transmission direction is opposite to that of the quantum channel transmission system Q1. The weak optical pulse train in transmission is lost in the middle of the transmission line, and only part of it reaches the receiver 302. The receiver 302 outputs detected data to the encryption key generation unit 303 as received information RD2. It is assumed that the information volume of the received information RD2 also gets down to the same level (about $1/1000$) of the information volume of the transmission information TD2 as is the case with the quantum channel transmission system Q1.

The encryption key generation unit 303 receives inputs of the transmission information TD1 having a large data volume and the received information RD2 having a quite small data volume. The encryption key generation unit 303 can generate a first encryption key by performing the basis reconciliation, the error correction, and the privacy amplification processing, on the transmission information TD1 and the received information RD1 in the other communication device B through the classical channel transmission system C. Similarly, the encryption key generation unit 403 also receives inputs of the transmission information TD2 having a large data volume and the received information RD1 having a quite small data volume. The encryption key generation unit 403 can generate a second encryption key by performing the basis reconciliation, the error correction, and the privacy amplification processing, on the transmission information TD2 and the received information RD2 in the other communication device A through the classical channel transmission system C. Because information volume attenuation arises equally in each of a pair of quantum channel transmission systems Q1 and Q2 having transmission directions opposite to each other, the same level of information volume is processed; consequently, the equalization of processing loads can be achieved between the encryption key generation units 303 and 403.

3. The Third Example Embodiment

Figure 4:
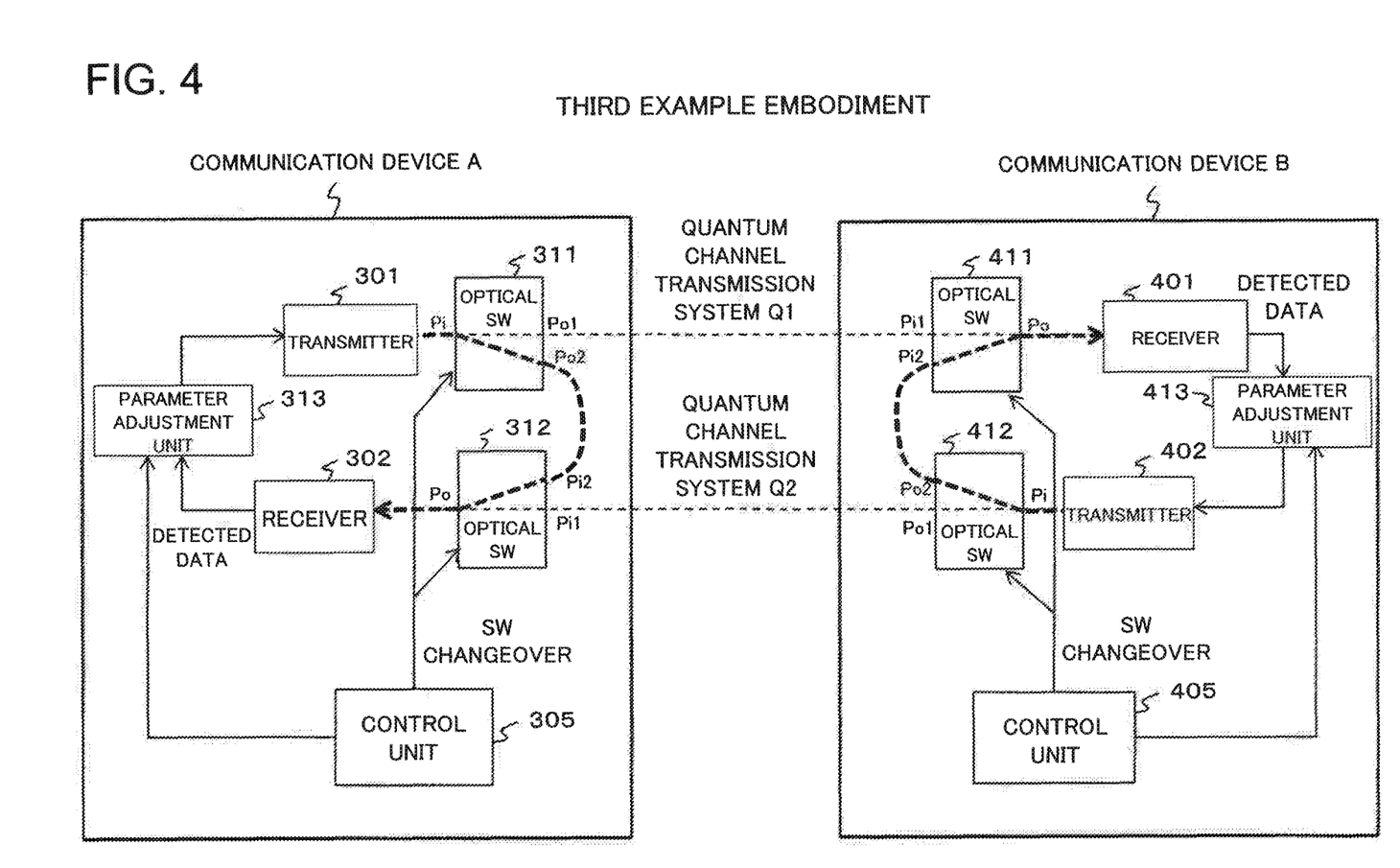
FIG. 4 is a block diagram illustrating a configuration example of an information communication system in accordance with a third example embodiment of the present invention.

An information communication system according to the third example embodiment of the present invention is a system obtained by adding a self-diagnostic function to each communication device according to the above-mentioned second example embodiment. Specifically, a transmission parameter adjusting function, and an optical route switching function of changing the route of transmission light so as to input the transmission light into the receiver in the own device at a time of parameter adjustment mode, are added.

Generally, in order to adjust a parameter such as transmission optical intensity of a transmitter that transmits the above-mentioned weak optical pulse, a receiver to receive the weak optical pulse is required. Since weak light is very weak light with one photon or less per bit, a detector that can detect a single photon is required; consequently, an avalanche photodiode is usually used. Accordingly, the parameter adjustment is performed using a receiver in the other communication device.

However, there is likely to be a wire-tapper on the transmission path, and there is the threat of damaging the security of QKD if a wire-tapper intervenes during the parameter adjustment. In addition, since a single photon detector is very expensive, it is not rational to install the receiver only for the parameter adjustment.

According to the present example embodiment, each communication device has a transmitter and a receiver for a quantum channel because a pair of quantum channel transmission systems Q1 and Q2 for transmission in opposite direction is provided. Accordingly, it is possible to utilize this receiver as a single photon receiver for parameter adjustment. The present example embodiment will be described below with reference to FIG. 4. In FIG. 4, the encryption key generation unit and the optical communication unit are not illustrated that are included in the communication device according to the above-mentioned second example embodiment.

As illustrated in FIG. 4, the communication device A according to the present example embodiment includes an optical switch 311 in the output side of the transmitter 301 and an optical switch 312 in the receiving side of the receiver 302, respectively. In addition, the communication device A includes a parameter adjustment unit 313 that adjusts a parameter such as the transmission optical intensity of the transmitter 301 using the detected data by the receiver 302. The control unit 305 controls the switching operations of the optical switches 311 and 312 and the adjustment operations of the parameter adjustment unit 313. Similarly, the communication device B according to the present example embodiment includes an optical switch 412 in the output side of the transmitter 402, and an optical switch 411 in the receiving side of the receiver 401, respectively. In addition, the communication device B includes a parameter adjustment unit 413 that adjusts a parameter such as the transmission optical intensity of the transmitter 402 using the detected data by the receiver 401. The control unit 405 controls the switching operations of the optical switches 411 and 412 and the adjustment operations of the parameter adjustment unit 413.

The optical switch 311 in the communication device A includes an input port Pi, an output ports Po1 and Po2, and the optical switch 312 includes input ports Pi1, Pi2 and an output port Po. The input port Pi of the optical switch 311 is optically connected to the output of the transmitter 301, the output port Po1 is optically connected to the above-mentioned quantum channel transmission system Q1, and the output port Po2 is optically connected to the input port Pi2 of the optical switch 312, respectively. The output port Po of the optical switch 312 is optically connected to the input of the receiver 302, the input port Pi1 is optically connected to the above-mentioned quantum channel transmission system Q2, and the input port Pi2 is optically connected to the output port Po2 of the optical switch 311, respectively.

In a normal operation state, the control unit 305 sets the optical switch 311 and the optical switch 312 so that the input port Pi and the output port Po1 of the optical switch 311 may be connected, and the input port Pi1 and the output port Po of the optical switch 312 may be connected. Consequently, the operation for the encryption key generation is performed through the quantum channel transmission systems Q1 and Q2, as mentioned above.

At the time of parameter adjustment, the control unit 305 sets the optical switch 311 and the optical switch 312 so that the input port Pi and the output port Po2 of the optical switch 311 may be connected, and the input port Pi2 and the output port Po of the optical switch 312 may be connected. Consequently, the weak optical signal outputted from the transmitter 301 is inputted into the receiver 302 through the output port Po2 of the optical switch 311, and the input port Pi2 and the output port Po of the optical switch 312. This enables the parameter adjustment unit 313 to adjust a parameter such as the transmission optical intensity of the transmitter 301 using the detected data by the receiver 302. In the communication device B, the optical switches 411 and 412, are configured and operate as with the above; accordingly, the description of them is omitted.

As mentioned above, according to the present example embodiment, an optical switch is included in each communication device as optical route switching means for turning back the transmission light from the transmitter to the receiver in the own device. At the time of the parameter adjustment mode, the control unit can complete the parameter adjustment in the own device by switching the optical switches so that the transmission light may be inputted into the receiver in the own device; therefore, it is possible to perform the parameter adjustment of the transmitter without damaging the security of QKD.

In the first to third example embodiments mentioned above, a pair of transmission system having transmission directions opposite to each other has been illustrated, but the present invention is not limited to these example embodiments, and a communication system having a plurality of pairs of transmission systems may be used.

The present invention has been described using the above-mentioned example embodiments as exemplary examples. However, the present invention is not limited to the above-mentioned example embodiments. That is to say, in the present invention, various aspects that a person skilled in the art can understand can be applied within the scope of the present invention.

This application is based upon and claims the benefit of priority from Japanese patent application No. 2014-170087 filed on Aug. 25, 2014, the disclosure of which is incorporated herein in its entirety by reference.

INDUSTRIAL APPLICABILITY

The present invention is generally applicable in an information communication system in which information transmission is performed by a plurality of transmission systems each of which has a predetermined transmission direction.

REFERENCE SIGNS LIST

10 First communication device
20 Second communication device
31 First transmission system
32 Second transmission system
33 First transmission line
34 Second transmission line
101 Transmitter
102 Receiver
103 Data processor
201 Receiver
202 Transmitter
203 Data processor
301 Transmitter
302 Receiver
303 Encryption key generation unit
304 Optical communication unit
305 Control unit
311, 312 Optical switch
313 Parameter adjustment unit
401 Receiver
402 Transmitter
403 Encryption key generation unit
404 Optical communication unit
405 Control unit
41, 412 Optical switch
413 Parameter adjustment unit

What is claimed is:

1. An information communication system, comprising:
a first transmission system configured to transmit information in a direction from a first communication device to a second communication device; and
a second transmission system configured to transmit information in a direction opposite to the direction of the first transmission system,
wherein each of the first communication device and the second communication device includes an information processor configured to perform information processing using transmission information transmitted from its own device and received information received from another communication device, and
a data volume of the received information is smaller than a data volume of the transmission information,
wherein each of the first communication device and the second communication device includes
a transmitter configured to transmit transmission information to another communication device,
a receiver configured to receive received information from the another communication device,
a switch configured to, at a time of parameter adjustment of the transmitter, turn back a transmission signal outputted from the transmitter and make the transmission signal be inputted to the receiver, and
a parameter adjustment unit configured to adjust a transmission parameter of the transmitter based on a received signal of the receiver having received the signal that is turned back.

2. A communication device, comprising:
a transmitting unit configured to transmit information to another communication device through a first transmission line;
a receiving unit configured to receive information through a second transmission line from the another communication device;
an information processor configured to perform information processing using the transmission information transmitted by the transmitting unit and the received information received from the another communication device,
wherein a data volume of the received information is smaller than a data volume of the transmission information;
a switch configured to, at a time of parameter adjustment of the transmitting unit, turn back a transmission signal outputted from the transmitting unit and make the transmission signal be inputted to the receiving unit; and
a parameter adjustment unit configured to adjust a transmission parameter of the transmitting unit based on a received signal of the receiving unit having received the signal that is turned back.

3. An information communication method, comprising:
transmitting and receiving information at each of a first communication device and a second communication device by use of a first transmission system and a second transmission system, the first transmission system and the second transmission system having transmission directions opposite to each other;
receiving part of transmission information as received information in each of the first transmission system and the second transmission system;
performing, at each of the first communication device and the second communication device, information processing using transmission information transmitted from its own device and received information received from another communication device,
wherein a data volume of the received information is smaller than a data volume of the transmission information;
turning back, at a time of parameter adjustment of a transmitter to transmit transmission information to another communication device, in each of the first communication device and the second communication device, a transmission signal outputted from the transmitter and making the transmission signal be inputted to a receiver to receive received information from the another communication device; and
adjusting a transmission parameter of the transmitter based on a received signal of the receiver having received the signal that is turned back.

4. The information communication system according to claim 1,
wherein the first transmission system is configured to transmit first random number information in a direction from the first communication device to the second communication device; and the second transmission system is configured to transmit second random number information in a direction opposite to the direction of the first transmission system, wherein in each of the first transmission system and the second transmission system, part of transmission random number information transmitted is received as received random number information.

5. The information communication system according to claim 4, wherein each of the first communication device and the second communication device includes an encryption key generation unit configured to generate an encryption key using the transmission random number information transmitted by its own device and the received random number information received from another communication device.

6. The information communication system according to claim 4, wherein each of the first communication device and the second communication device includes a transmitter configured to transmit transmitting random number information to another communication device, a receiver configured to receive received random number information from the another communication device, a switch configured to, at a time of parameter adjustment of the transmitter, turn back a transmission signal outputted from the transmitter and make the transmission signal be input to the receiver, and a parameter adjustment unit configured to adjust a transmission parameter of the transmitter based on a received signal of the receiver having received the signal that is turned back.

7. The information communication system according to claim 5, wherein each of the first communication device and the second communication device includes a transmitter configured to transmit transmitting random number information to another communication device, a receiver configured to receive received random number information from the another communication device, a switch configured to, at a time of parameter adjustment of the transmitter, turn back a transmission signal outputted from the transmitter and make the transmission signal be input to the receiver, and a parameter adjustment unit configured to adjust a transmission parameter of the transmitter based on a received signal of the receiver having received the signal that is turned back.

* * * * *